United States Patent
Chengalvala et al.

(10) Patent No.: US 12,479,294 B2
(45) Date of Patent: Nov. 25, 2025

(54) SYSTEM AND METHOD FOR MANAGING A VEHICLE EVENT MODE

(71) Applicant: Ford Global Technologies, LLC, Dearborn, MI (US)

(72) Inventors: Venkata Maruthe Ravikumara Sharma Chengalvala, Troy, MI (US); James Wilhelm Heaton, Saline, MI (US)

( * ) Notice: Subject to any disclaimer, the term of this patent is extended or adjusted under 35 U.S.C. 154(b) by 522 days.

(21) Appl. No.: 18/049,898

(22) Filed: Oct. 26, 2022

(65) Prior Publication Data

US 2024/0140198 A1 May 2, 2024

(51) Int. Cl.
| | | |
|---|---|---|
| B60K 35/10 | (2024.01) | |
| B60K 35/22 | (2024.01) | |
| B60K 35/26 | (2024.01) | |
| B60K 35/28 | (2024.01) | |
| B60K 35/85 | (2024.01) | |

(52) U.S. Cl.
CPC ............. B60K 35/10 (2024.01); B60K 35/22 (2024.01); B60K 35/26 (2024.01); B60K 35/28 (2024.01); B60K 35/85 (2024.01); *B60K 2360/16* (2024.01); *B60K 2360/21* (2024.01); *B60K 2360/589* (2024.01)

(58) Field of Classification Search
CPC ........ B60K 35/00; B60K 35/22; B60K 35/26; B60K 35/28; B60K 35/85; B60K 2360/16; B60K 2360/21; B60K 2360/589; B60K 2360/592; B60K 35/10
See application file for complete search history.

(56) References Cited

U.S. PATENT DOCUMENTS

| | | | |
|---|---|---|---|
| 9,063,803 B1* | 6/2015 | Lewkovitz | .......... G06F 11/1438 |
| 10,142,758 B2 | 11/2018 | Sikora | |
| 10,334,050 B2 | 6/2019 | Kentley-Klay et al. | |
| 10,708,542 B1* | 7/2020 | Griffin | .................... H04W 4/40 |
| 2017/0061965 A1 | 3/2017 | Penilla et al. | |
| 2019/0208142 A1 | 7/2019 | Kitaya et al. | |
| 2020/0213560 A1* | 7/2020 | Zhang | .................... H04N 7/147 |

OTHER PUBLICATIONS

Guest Contributor, Tesla "Party Mode" Coming Soon, Spotted by Hacker, Jun. 8, 2019, 1-7.
Antuan Goodwin, 2010 Toyota 4Runner Features a 'Party Mode', Oct. 5, 2009, 1-9.

* cited by examiner

*Primary Examiner* — Thomas Ingram
(74) *Attorney, Agent, or Firm* — Joseph Zane; Eversheds Sutherland (US) LLP

(57) ABSTRACT

A method to manage an event mode of a vehicle. The method includes receiving first input associated with the vehicle event mode. The method further includes determining an event type based on the first input. Further, the method includes obtaining an event type information. The event type information may include user preferences corresponding to the determined event type. In addition, the method includes determining whether the event is inside or outside the vehicle. Based on the determination whether the event is inside or outside the vehicle, the event type, and the event type information, the method includes selecting a vehicle unit configuration, and activating or actuating vehicle units based on the vehicle unit configuration.

20 Claims, 5 Drawing Sheets

SYSTEM AND METHOD FOR MANAGING A VEHICLE EVENT MODE

TECHNICAL FIELD

The present disclosure relates to a system and method for managing a vehicle event mode, and more particularly, to selecting and activating vehicle units based on an event type and user preferences.

BACKGROUND

People gather to celebrate different kinds of occasions for entertainment. For instance, people celebrate national holidays, religious holidays, birthdays, graduation ceremonies, and the like. Similarly, people go out for picnics, camps, events, or other outdoor activities with their family and friends.

Sometimes, a few family members and/or friends are unable to join the celebration/events, as they may be located at remote locations. Consequently, the non-participants miss the fun and the event experience. Typically, the participants capture event audio, image and/or video recordings and transmit them with the non-participants to share the experience. In this case, the participants typically capture the image or video recordings by themselves, by using their cameras or mobile phones. At times, the participants may focus more on capturing the moments rather than enjoying the celebration/events themselves. Additionally, the participants may have to carry their cameras or mobile phones to ensure that no important moment is missed.

Thus, there is a need for a system and method that facilitates the participants to conveniently capture the real-time event experience and share it with the non-participants with ease. Likewise, there is a need for a system and method for the non-participants to join the event remotely.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
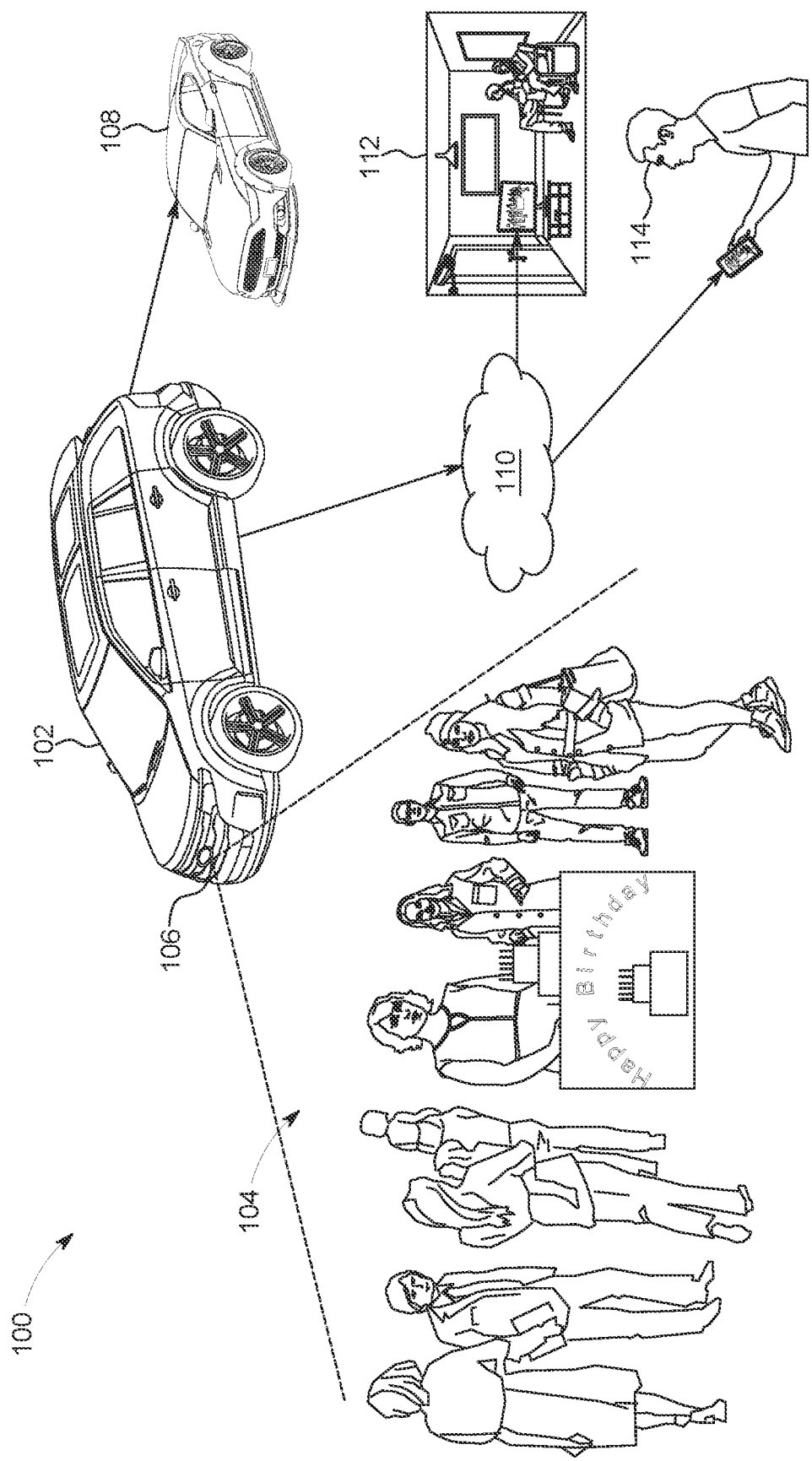
FIG. 1 depicts an example environment in which techniques and structures for providing the systems and methods disclosed herein may be implemented.

The present disclosure describes a system and method to manage a vehicle event mode. The vehicle event mode may be associated with a celebration, for example, a birthday party, an office party, a family picnic, a graduation ceremony, and/or the like. In addition, the vehicle event mode may be associated with a public procession, and/or the like. A vehicle may obtain a request to activate the vehicle event mode from a user device, a vehicle infotainment system and/or a server. In some aspects, the vehicle may determine an event type (e.g., picnic or birthday) based on the obtained request. In response to determining the event type, the vehicle may obtain user preferences corresponding to the determined type. The vehicle may select and activate vehicle units (such as, a vehicle camera, a vehicle microphone, and the like) to activate the vehicle event mode, based on the obtained user preferences.

In one or more aspects, the vehicle may activate the vehicle camera and the vehicle microphone to capture a first event audiovisual recording. In some aspects, the vehicle may transmit the first event audiovisual recording to the server or another vehicle. In addition, the vehicle may receive a second event audiovisual recording from the server or the other vehicle. In one or more aspects, the first event audiovisual recording and the second event audiovisual recording may be associated with the same event.

In one or more aspects, the vehicle may additionally determine whether the event location is inside or outside the vehicle (i.e., in the vehicle vicinity). The vehicle may further select and activate the vehicle units based on the determined event location.

In some aspects, the vehicle units may further include, for example, a vehicle audio system, a music system, vehicle lights, an HMI display, a vehicle fragrance system, vehicle wireless transceivers, and/or the like.

As an example, the vehicle may activate external cameras and a vehicle-to-vehicle (V2V) communication transceiver, when the event is outside the vehicle and the vehicle user prefers to transmit event videos to other vehicles in the vicinity. In some aspects, the vehicle may transmit the event videos to the server, by using the vehicle wireless transceivers. The server may store and/or transmit the videos to other users or social network, based on the vehicle user's preferences. Similarly, the vehicle may receive event videos from other users (via the server) and/or other vehicles via V2V communication.

In one or more aspects, the vehicle may receive the activation request for the event mode via a mobile application installed on the user device. In other aspects, the vehicle may receive the activation request from the server. In some aspects, the server may dynamically fetch a calendar of events associated with the vehicle user. The server may trigger and transmit an automated activation request to the vehicle, based on the event calendar. Specifically, the server may send the activation request a predetermined time before an event (for example, five minutes) or at the event time.

The present disclosure provides a system and method to manage a vehicle event mode. In some aspects, the system may automatically activate the vehicle event mode based on a fetched event calendar, thereby minimizing human intervention. Further, the system facilitates automated capturing of event moments (e.g., videos) and transmits video feed, recordings, images, sounds, and messages among other interactive content with other connected devices operable by members of the user's community, such as family and friends. Hence, the present disclosure provides an advantage for the vehicle user that provides a system allowing them to focus on event, community, and interaction rather than manually capturing the moments using their personal device (s). In addition, the present disclosure allows the non-participants to attend and experience the event remotely. Aspects of the present disclosure may increase the value of user experience of operating a connected vehicle and/or personal computing device.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. More particularly, FIG. 1 depicts the example environment 100 that may include a vehicle 102. The vehicle 102 may take the form of any passenger or commercial vehicle such as, for example, a car, a work vehicle, a crossover vehicle, a van, a minivan, a taxi, a bus, etc. Further, the vehicle 102 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

In accordance with some aspects of the present disclosure, one or more individuals 104 may gather to join an event, near the vehicle 102. It should be appreciated that near the vehicle 102 may include any area proximate to a connected vehicle that may be within range of one or more vehicle sensory devices, and may include an interior vehicle portion (e.g., a vehicle cabin) or a vehicle exterior space.

An event or celebration as referenced herein may include, but is not limited to birthday celebration, a national holiday, a religious holiday, a graduation ceremony, a party, gathering, meeting, or any other group interactive activity. Additionally, the one or more individuals 104 may gather for community or family events, for example, a picnic, camping, a car rally, or similar events. In one or more aspects, the one or more individuals 104 may join the event (such as, for example, a birthday celebration) outside or inside the vehicle 102. In FIG. 1, the one or more individuals 104 are shown to celebrate the event in the proximity of (e.g., outside) the vehicle 102.

In accordance with some aspects, the vehicle 102 may receive a request to activate a vehicle event mode. The request may include inputs (e.g., details) associated with the event. In some aspects, an operator/user associated with the vehicle 102 may send the request to the vehicle 102 to activate the event mode, or a server (not shown in FIG. 1) may send the request to the vehicle 102 to activate the event mode.

In some aspects, on receipt of the request, the vehicle 102 may determine an event type based on the received inputs. For example, the vehicle 102 may determine the event type to be a birthday party, a picnic, an office party, and/or the like. In some aspects, the vehicle 102 may determine the event type from the received inputs associated with the event.

On determination of the event type, in one aspect of the present disclosure, the vehicle 102 may send a request to the vehicle user (via a user device or a vehicle information system) or the server to provide user preferences associated with the event type. In some aspects, the user preferences may be different for different types of event. Therefore, responsive to determining the event type, the vehicle 102 may send the request to receive the user preferences associated with the determined event type.

The user preferences may be associated with vehicle functions or units. For instance, the user preferences may include, but are not limited to, a type of music, music volume, configuration/setting of vehicle cameras, configuration/setting of vehicle exterior lights, a type of vehicle fragrance, capturing of images/videos by the vehicle cameras, sharing captured images/videos with other vehicles or individuals, receiving images/videos from the other vehicles or individuals, video or audio mode of a vehicle infotainment system, and/or the like.

As an example of a user preference, for a birthday celebration, the vehicle user may prefer that internal vehicle cameras (not shown in FIG. 1) and a vehicle infotainment system turn ON, while external vehicle cameras (such as a front exterior camera 106) be powered OFF. In this case, the vehicle infotainment system may receive images/videos from other vehicles or individuals. Similarly, the vehicle user may prefer that for office parties, the external cameras turn ON, while the internal cameras and the vehicle infotainment system remain OFF. Other combinations of sensory device activation/deactivation are possible and such combinations are contemplated herein.

In response to sending the request to the vehicle user or the server, the vehicle 102 may receive the user preferences associated with the event type.

In accordance with another aspect of the present disclosure, the vehicle 102 may fetch the user preferences from a vehicle memory (not shown in FIG. 1). For example, the vehicle memory may pre-store the user preferences, and the vehicle 102 may send a request to the vehicle memory to receive the user preferences.

In some aspects of the present disclosure, the vehicle 102 may determine whether the event is outside or inside (e.g., the celebration location) the vehicle 102, responsive to determining the user preferences corresponding to the event type. In some aspects, the vehicle 102 may determine the event location by determining a vehicle occupation mode. For instance, the vehicle 102 may determine the vehicle occupation mode by using seat sensors or internal vehicle cameras (not shown in FIG. 1).

In further aspects of the present disclosure, the vehicle 102 may determine specific event position with respect to the vehicle 102. For instance, the vehicle 102 may determine whether the event is in front side of the vehicle 102, or any other side of the vehicle 102. In some aspects, the vehicle 102 may determine the event position responsive to the vehicle occupation mode determination. For instance, the vehicle 102 may determine the event position when the vehicle 102 determines that the event is happening outside the vehicle 102. In some aspects, the vehicle 102 may determine the event position by using external vehicle cameras.

In some aspects, the vehicle 102 may select and activate vehicle functions or units, based on the determined event type, user preferences and the event location/position.

For instance, the vehicle 102 may select and activate a first vehicle unit configuration responsive to determining that the vehicle user is celebrating his birthday outside of the vehicle 102. The vehicle units may include exterior/interior camera(s), exterior/interior audio speakers, exterior/interior lights, exterior/interior microphones, car fragrance system, transceivers (e.g., a vehicle-to-vehicle (V2V) transceiver, a Bluetooth™ transceiver, a ultra-wideband (UWB) transceiver, a fifth-generation (5G) transceiver, a Long-Term Evolution (LTE) transceiver), vehicle infotainment system, and the like. As an example, the vehicle 102 may select and activate the external cameras, microphones, speakers, lights, and/or other sensory and input devices responsive to determining that the celebration/event is taking place outside of the vehicle 102. Likewise, the vehicle 102 may select and activate a front exterior camera 106 when the celebration/event is in the front of the vehicle 102.

Similarly, the vehicle 102 may select and activate a second vehicle unit configuration, when the vehicle 102 determines that the celebration/event is inside the vehicle 102. For example, the vehicle 102 may activate the internal audio system and speakers, vehicle infotainment system, and play soft music, in the second vehicle unit configuration. In this case, the vehicle infotainment system may display images/videos received from other vehicles or individuals. Likewise, the vehicle 102 may select and activate interior cameras based on a vehicle user sitting position (and other vehicle passengers), when the celebration/event is inside the vehicle 102.

In some aspects, the vehicle user may want to share the event experience with other individuals who may not be with the vehicle user at the event time, while the event takes place (or afterwards). In this scenario, the vehicle 102 may capture the images or videos of the event using external/internal cameras, based on the user preferences (and the event location and position). Post capturing, the vehicle 102 may share, via the transceiver, the captured images or videos with other individuals or vehicles. For instance, the vehicle 102 may transmit the images or videos to another vehicle 108, using vehicle-to-vehicle (V2V) communication. In this case, an individual (non-participant) may view the event remotely via the vehicle 108. In addition, or alternatively, the vehicle 102 may transmit the images or videos to a cloud server 110 (or a cloud 110) for sharing the images or videos with a family 112 or another individual 114. In this case, the family 112 or the individual 114 may download the images or videos from the cloud 110 or may watch an event live stream.

In accordance with some aspects of the present disclosure, the vehicle 102 may transmit the captured images or videos, based on the user preferences. For example, based on user preferences, the vehicle 102 may transmit birthday celebration videos with the family 112, but may avoid transmitting office party videos with the family 112.

In further aspects of the present disclosure, the vehicle 102 may receive images/videos (associated with the event) from the vehicle 108 and/or the cloud 110. In one or more aspects, the vehicle 102 may display the images/videos on the vehicle infotainment system, based on the user preferences associated with the event type and the event location.

Figure 2:
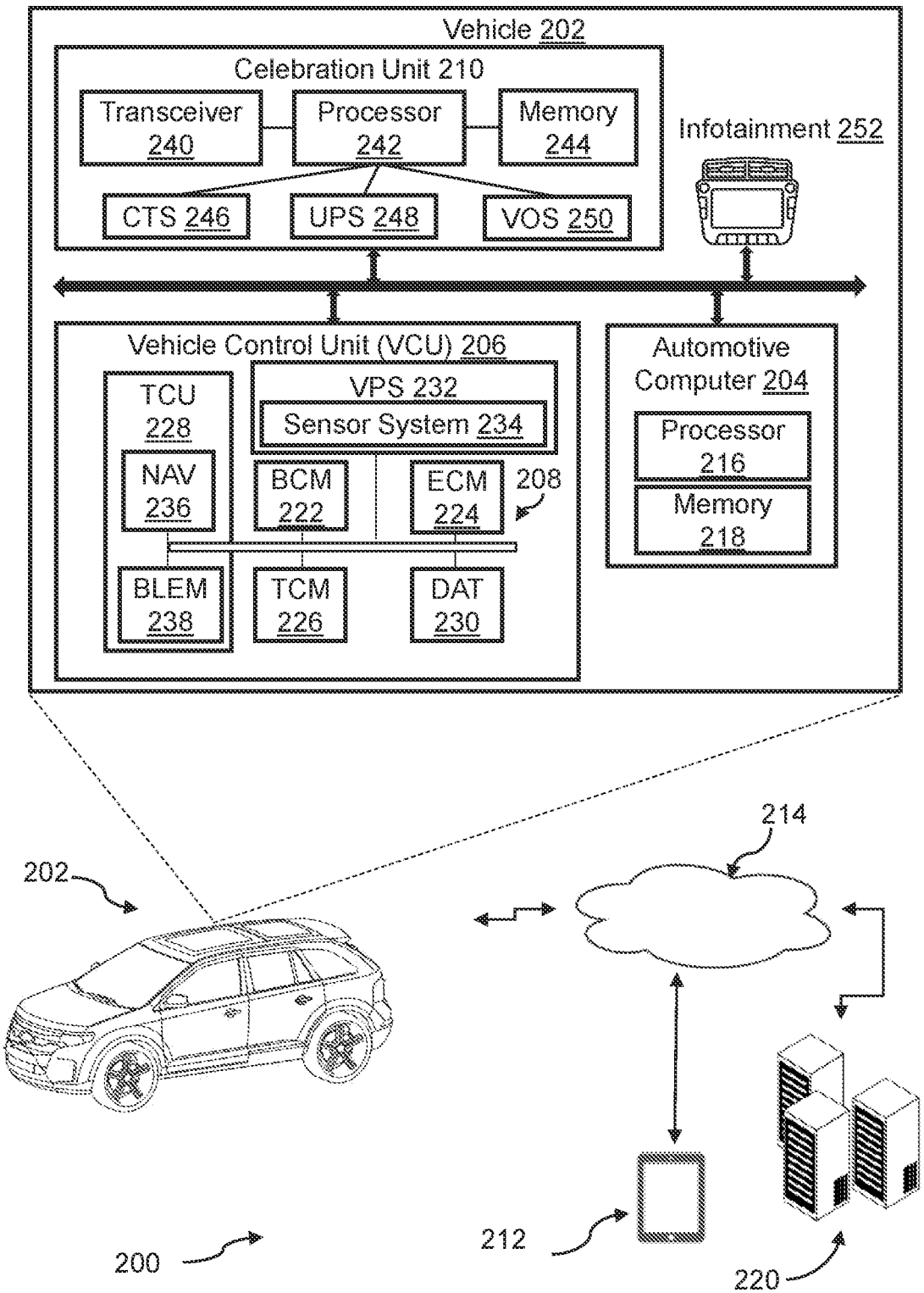
FIG. 2 depicts a system to manage a vehicle event mode, in accordance with the present disclosure.

FIG. 2 depicts a system 200 to manage a vehicle event mode, in accordance with the present disclosure. More particularly, FIG. 2 depicts the system 200 that may include a vehicle 202. The vehicle 202 may include an automotive computer 204, a Vehicle Control Unit (VCU) 206, and a celebration unit 210 (or an event unit). The VCU 206 may include a plurality of Electronic Control Units (ECUs) 208 disposed in communication with the automotive computer 204.

The system 200 may further include a mobile device 212 that may connect with the automotive computer 204 and/or the celebration unit 210 by using wired and/or wireless communication protocols and transceivers. In some aspects, the mobile device 212 may be associated with a vehicle user/operator (not shown in FIG. 2). The mobile device 212 may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques. Further, the mobile device 212 may include a memory (not shown in FIG. 2) for storing program instructions associated with an application that, when executed by a mobile device processor (not shown in FIG. 2), performs aspects of the disclosed embodiments. The application (or "app") may be part of the celebration unit 210 or may provide information to the celebration unit 210 and/or receive information from the celebration unit 210.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the celebration unit 210 may be installed in a vehicle engine compartment (or elsewhere in the vehicle 202) and operate as a functional part of the celebration unit 210, in accordance with the disclosure. The automotive computer 204 may be or include an electronic vehicle controller, having one or more processor(s) 216 and a memory 218. Moreover, the celebration unit 210 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a vehicle event mode program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the automotive computer 204 may be disposed in communication with one or more server(s) 220, and the mobile device 212. The server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet.

In accordance with some aspects of the present disclosure, the VCU 206 may share a power bus with the automotive computer 204, and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 208, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. In some aspects, the VCU 206 may control vehicle 202 operational aspects and implement one or more instruction sets received from the application operating on the mobile device 212, from one or more instruction sets stored in computer memory 218 of the automotive computer 204, including instructions operational as part of the celebration unit 210.

The TCU 228 can be configured and/or programmed to provide vehicle connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems, computers, and modules. The TCU 228 may be disposed in communication with the ECUs 208 by way of a bus.

In one aspect of the present disclosure, the ECUs 208 may control aspects of vehicle operation and communication using inputs from human drivers, inputs from an autonomous vehicle controller, the celebration unit 210, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, a vehicle fragrance system, door locks and access control, vehicle energy management, and various comfort controls. The BCM 222 may also operate as a gateway for bus and network interfaces to interact with remote ECUs (not shown in FIG. 2).

In some aspects, the DAT controller 230 may provide Level-1 through Level-3 automated driving and driver assistance functionality that can include, for example, active parking assistance, trailer backup assistance, adaptive cruise control, lane keeping, and/or driver status monitoring, among other features. The DAT controller 230 may also provide aspects of user and environmental inputs usable for user authentication.

The DAT controller 230 can further obtain input information via the sensory system(s) 234, which may include sensors disposed on the vehicle interior and/or exterior (sensors not shown in FIG. 2). The DAT controller 230 may receive the sensor information associated with driver functions, vehicle functions, and environmental inputs, and other information.

In some aspects, the automotive computer 204 may connect with an infotainment system 252 that may include a touchscreen interface portion, and may include voice recognition features, biometric identification capabilities that can identify users based on facial recognition, voice recognition, fingerprint identification, or other biological identification means. In other aspects, the infotainment system 252 may provide user identification using mobile device pairing techniques (e.g., connecting with the mobile device 212, a Personal Identification Number (PIN)) code, a password, passphrase, or other identifying means.

The computing system architecture of the automotive computer 204, the VCU 206, and/or the celebration unit 210 may omit certain computing modules. It should be readily understood that the computing environment depicted in FIG. 2 is an example of a possible implementation according to the present disclosure, and thus, it should not be considered limiting or exclusive.

In accordance with some aspects of the present disclosure, the celebration unit 210 may be integrated with and/or executed as part of the ECUs 208. The celebration unit 210, regardless of whether it is integrated with the automotive computer 204 or the ECUs 208, or whether it operates as an independent computing system in the vehicle 202, may include a transceiver 240, a processor 242, and a computer-readable memory 244. The processor 242 may instantiate one or more modules such as a celebration type sub-unit (CTS) 246, a user preference sub-unit (UPS) 248, and/or a vehicle occupation sub-unit (VOS) 250 based on instruction sets stored in the memory 244.

In accordance with some aspects of the present disclosure, the transceiver 240 may be configured to receive a first input associated with the vehicle event mode. The first input may include a request to activate the vehicle event mode. In one or more aspects, the transceiver 240 may receive the first input from the server 220 via the network 214. In particular, the server 220 may store a real-time calendar associated with the vehicle user. The calendar may include event details (such as an event type, event date, event time, and/or event attendees). In some aspects, the server 220 may dynamically fetch the user calendar from social networking profiles, user devices, or other such sources associated with the vehicle user, and may transmit the event details to the transceiver 240. In other words, the transceiver 240 may receive the request for vehicle event mode activation from the server 220.

In some aspects, the server 220 may send the request to the transceiver 240 a predetermined time (e.g., 1 minute or 5 minutes) before a planned event. In one or more aspects, the server 220 may transmit the request at the event time to activate the vehicle event mode. Alternatively, the server 220 may transmit the user calendar at a predefined frequency (e.g., twice every day). The transceiver 240 may receive the calendar and store it in the memory 244.

In other aspects of the present disclosure, the transceiver 240 may receive the first input from the user via a Human-Machine Interface (HMI) disposed as part of the infotainment system 252 or a hard button (not shown in FIG. 2) present in the vehicle 202. Alternatively, the transceiver 240 may receive the first input from the user via the mobile device 212 (e.g., via an installed application) or the server or cloud 220 (such as via a website). For instance, the vehicle user may transmit the request to activate the vehicle event mode via the mobile device 212 (such as by using the Bluetooth or an ultra-wideband (UWB) transceiver) when the vehicle user is in vicinity of the vehicle 202. In some aspects, the vehicle user may transmit the request to activate the vehicle event mode via a digital assistant (e.g., Amazon™ Alexa™). Alternatively, the vehicle user may transmit the vehicle event mode activation request via the server 220 (e.g., by using a website), when the vehicle user is remote from the vehicle 202. In such scenarios, the vehicle user may request vehicle event mode activation as and when there is an event and may send the corresponding details associated with the event to the transceiver 240.

In some aspects, the transceiver 240 receives the first input and store the first input in persistent memory (e.g., the memory 244). The processor 242 may then fetch or obtain the first input from the memory 244. Responsive to fetching the first input, the processor 242 may determine an event type via the CTS 246.

In particular, the processor 242 may obtain, via the CTS 246, the event type from the event details transmitted by the server 220. For instance, the server 220 may transmit the event details indicating that the user has a birthday party to attend at 5 pm. In this case, the processor 242 may determine that the event type is birthday.

Alternatively, the processor 242 may determine the event type from the first input provided by the user, when the user sends the event mode activation request to the transceiver 240. For instance, when the user sends a request to activate the event mode through the infotainment system 238 (or the mobile device 212) to the transceiver 240, the processor 242 may obtain or fetch the request from the transceiver 240. On receipt of the request, the processor 242 may transmit a request, via the transceiver 240, to the user to provide additional event details. For instance, the processor 242 may transmit one or more options (e.g., "Birthday celebration", "Graduation ceremony", "Family outing", "Other events", and/or the like) for the user to select on the infotainment system 252 (or the mobile device 212). Based on the user selection, the processor 242 may determine the event type.

In accordance with further aspects of the present disclosure, the processor 242 may transmit, via the UPS 248, instructions to the transceiver 240 to obtain a event type information, upon determining the event type. In particular, the event type information may include user preferences associated with the event type. In some aspects, the transceiver 240 may obtain the user preferences (for example, a second input) associated with the event type from the server 220. In particular, the transceiver 240 may transmit a request (including the determined event type) to the server 220 to provide the user preferences corresponding to the determined event type. Upon receiving the request, the server 220 may transmit the user preferences to the transceiver 240. In some aspects, the transceiver 240 may receive the first input and the second input simultaneously from the server 220.

In the aspect described above, the server 220 may map and store different event types with user preferences. Specifically, in some aspects, the server 220 may receive user preferences corresponding to different event types from the vehicle user at regular intervals and may store the user preferences in the mapping mentioned above. For example, the server 220 may store information that for "Birthday celebration", the vehicle user prefers to hear birthday songs on the vehicle audio system, prefers loud music, vanilla fragrance in the vehicle 202, and activation of internal vehicle cameras and the infotainment system 252. On the other hand, when the vehicle user is camping with friends, he prefers to activate external cameras (including 360 degree view), record videos for a particular time period (such as, for example, a 30 minute video duration), store the recorded videos at specific folders on the server 220, automatically transmit the recorded videos to particular family members or friends, and/or take other actions associated with sharing or joining in celebration with others. Furthermore, the user may prefer to disable the vehicle event mode when the user is driving.

In some aspects, on receipt of the request from the transceiver 240, the server 220 may determine the user preferences associated with the event type from the stored mapping and may then transmit the user preferences to the transceiver 240.

In other aspects of the present disclosure, the processor 242 may determine the user preferences by obtaining/fetching the user preferences pre-stored in the memory 244 (or the memory 218), via the UPS 248. In this case, the memory 244 (or the memory 218) may store the mapping of different event types with user preferences.

In yet another aspect, the processor 242 may determine the user preferences by transmitting a request to the user, via the transceiver 240, to provide user preferences via the UPS 248. For instance, the user may select his preferences based on one or more options displayed on the infotainment system 252.

In accordance with further aspects of the present disclosure, the processor 242 may determine whether the event is outside or inside the vehicle 202. In some aspects, the processor 242 may determine the place of event by determining a vehicle occupation mode via the VOS 250. In some aspects, the VOS 250 may receive information associated with the vehicle occupation from the sensor system 234. In one aspect, the sensor system 234 may include vehicle seat sensors. The vehicle seat sensors may indicate that the vehicle 202 is occupied when the vehicle user and/or other passengers are inside the vehicle 202. On the other hand, the vehicle seat sensors may indicate that the vehicle 202 is unoccupied when the user/passengers are outside the vehicle 202.

The processor 242 may determine the vehicle occupation mode responsive to the processor 242 receiving or retrieving the request to activate the vehicle event mode from the server 220 or from a vehicle user (via the infotainment system 252 or the mobile device 212). For instance, the processor 242 may determine that the event is outside the vehicle 202, when the processor 242 receives the request to activate the event mode and the vehicle 202 is unoccupied. Similarly, the processor 242 may determine that the event is inside the vehicle 202 when the vehicle user requests to activate the event mode through the infotainment system 252.

In some aspects, the processor 242 may determine the vehicle occupation mode (e.g., whether the user is inside or outside the vehicle 202) through the ECUs 208. For instance, the processor 242 may obtain information associated with the vehicle occupancy by using the interior vehicle cameras.

In accordance with further aspects of the present disclosure, the processor 242 may determine whether the event is outside or inside the vehicle 202 based on the event type. For instance, the processor 242 may determine that the event is outside the vehicle 202 when the processor 242 determines that the event type is picnic. In yet another aspect, the processor 242 may determine whether the event is inside or outside the vehicle 202 based on historical user trends associated with different types of events. In some aspects, the memory 244 (or the memory 218) may receive and store the historical user trends and/or a mapping of different event types with vehicle occupation modes. In one or more aspects, the memory 244 may receive the historical user trends and/or the mapping from the server 220.

In further aspects of the present disclosure, the processor 242 may determine event position or location. For instance, the processor 242 may determine whether the event is in front side of the vehicle 202, or any other side of the vehicle 202. In some aspects, the processor 242 may determine the event position or location responsive to the determination of the vehicle occupation mode. For instance, the processor 242 may determine the event position or location when the processor 242 determines that the event is outside the vehicle 202. In some aspects, the processor 242 may determine the event position by using external vehicle cameras.

In one or more aspects of the present disclosure, the processor 242 may select a configuration of vehicle units, when the processor 242 determines whether the event is inside or outside the vehicle 202, the event position or location, and the user preferences corresponding to the event type. The vehicle units may include, but are not limited to, exterior/interior camera(s), exterior/interior audio system, speakers, exterior/interior lights, transceivers (including a vehicle-to-vehicle (V2V) transceiver, a Bluetooth™ transceiver, an ultra-wideband (UWB) transceiver, a fifth-generation (5G) transceiver, and a Long-Term Evolution (LTE) transceiver), and the like. In some aspects, the vehicle 202 may include a plurality of transceivers, for example, the transceiver 240 to receive the event mode activation request from the vehicle user and/or the server 220, the V2V transceiver to enable V2V communication, the Bluetooth™ transceiver to enable communication via Bluetooth™ in the vehicle 102, and the like.

In some aspects, the processor 242 may activate the vehicle units based on the selected configuration. For instance, when the processor 242 determines that the user is attending a vehicle showcase event (by determining the event type and vehicle occupancy), the processor 242 may select and activate the vehicle unit configuration based on the user preferences for such vehicle events. In particular, the processor 242 may activate the 360-view setting of the exterior vehicle camera(s), play specific songs, enable exterior audio system/speakers, record the video of the event for a predetermined time period (e.g., 2 hours), and transmit, via the server 220, the recording in real-time with one or more friends who may not be present in the event. In addition, the processor 242 may activate the V2V transceiver to receive images/videos from other vehicles in the showcase event, and may cause the infotainment system 252 to display the received images/videos.

Figure 3:
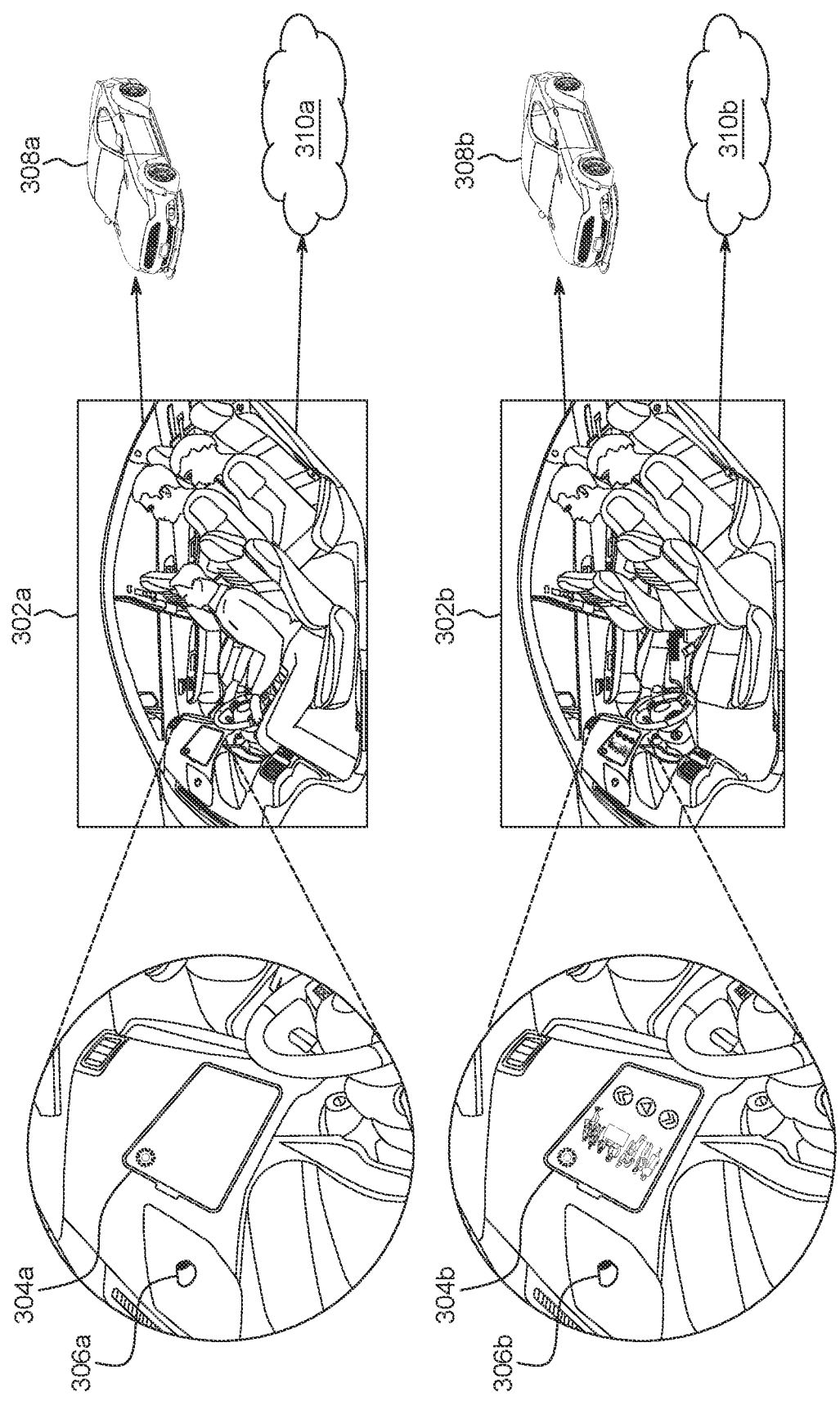
FIG. 3 depicts example embodiments of a vehicle event mode, in accordance with the present disclosure.

FIG. 3 depicts example embodiments of an event mode of vehicles 302a, 302b, in accordance with the present disclosure. The vehicle 302a depicts a vehicle that a driver/user drives, and the vehicle 302b depicts an autonomous vehicle. The vehicles 302a and 302b may be the same as the vehicle 202.

In some aspects of the present disclosure, the processor 242 of the celebration unit 210 may select vehicle unit configuration based on a vehicle driving mode. For instance, the processor 242 may disable video on an infotainment system 304a, when the vehicle user is celebrating an occasion (e.g., attending a birthday party virtually) inside the vehicle 302a, and the processor 242 determines that the user is driving the vehicle 302a. In this scenario, the processor 242 may activate an interior audio system (not shown in FIG. 3) based on user preferences. In addition, the processor 242 may enable a configuration/setting of a vehicle fragrance system 306a based on the user preferences associated with the event type (and whether the event is inside or outside the vehicle 302a), as discussed above in conjunction with FIG. 2. Further, the processor 242 may capture the event images/videos by using the vehicle interior camera(s) based on the user's preferences and transmit the captured images/video to a connected vehicle 308a (via V2V communication) and/or other individuals via a network 310a.

In accordance with further aspects of the present disclosure, the processor 242 may display the videos/images on an infotainment system 304b, when the user is celebrating the event inside the autonomous vehicle 302b. In other words, the processor 242 may enable viewing of the video of the event on the infotainment system 304b when the vehicle 302b is an autonomous vehicle (or when the vehicle user is not driving, in the case of the vehicle 302a). In this scenario, the processor 242 may enable the interior vehicle cameras to capture the images/videos and transmit the captured images/video to a connected vehicle 308b and/or the other individuals via a network 310b (same as the network 310a), and provide live feed to the infotainment system 304b. As discussed above, the processor 242 may enable a configuration/setting of a vehicle fragrance system 306b based on the user preferences associated with the event type, and when the event/celebration is inside the vehicle 302b.

In some aspects, the vehicle 302b may also receive video live feeds of events happening outside of the vehicle 302b (e.g., at remote locations, at the connected vehicle 308b, and the like) on the infotainment system 304b. Notwithstanding the discussion above as to the illustrative embodiments of vehicles 302a and 302b, if there is an driver/user in the driver's seat, the vehicle 302a/302b should be stationary when the disclosed event mode is in use, pending the evolution of technology to where it is safe to use the event mode of the present disclosure while there is a driver/user in the driver's seat and the vehicle is in motion.

Figure 4:
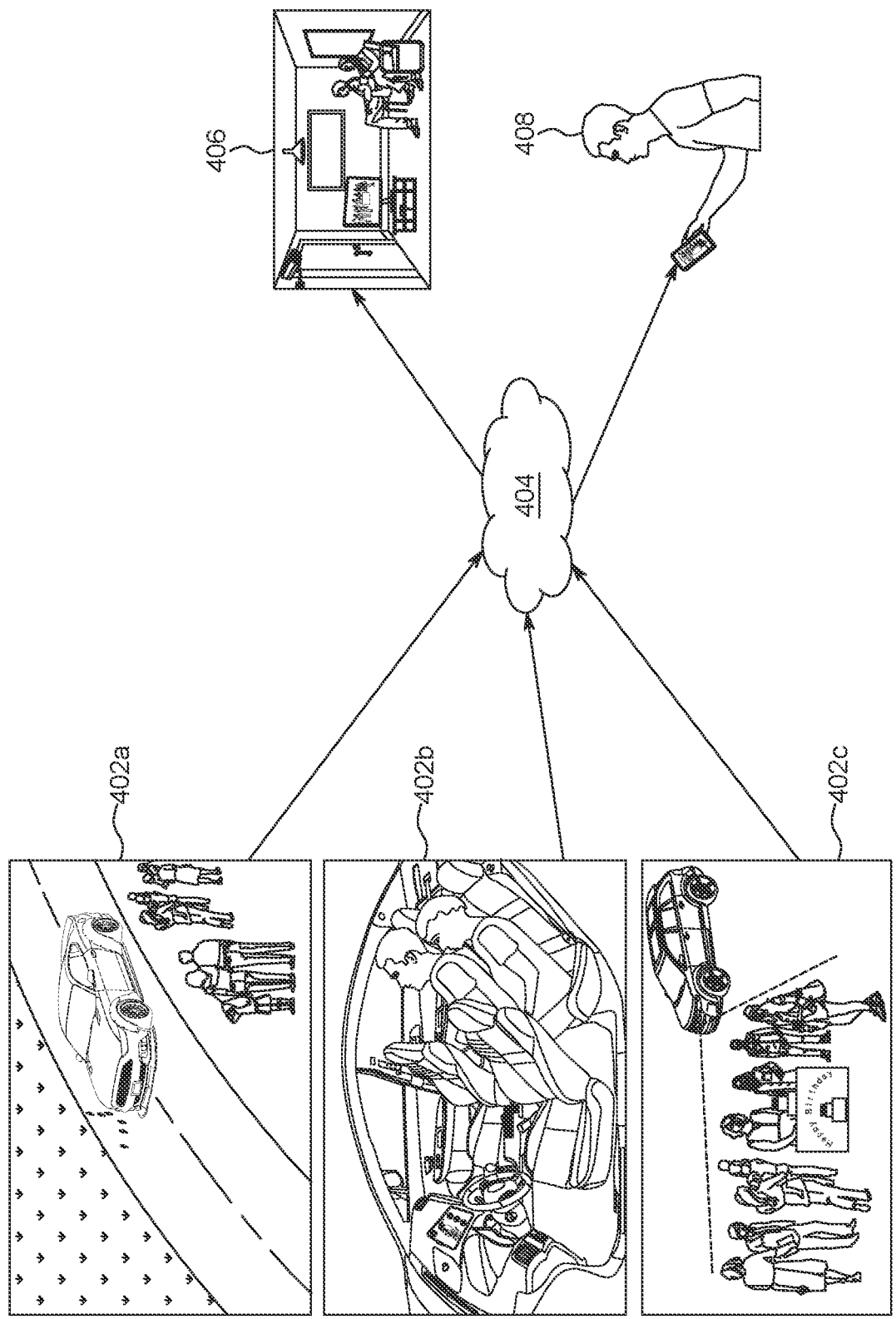
FIG. 4 depicts another example embodiment of a vehicle event mode, in accordance with the present disclosure.

FIG. 4 depicts another example embodiment of a vehicle event mode, in accordance with the present disclosure. In particular, FIG. 4 depicts multiple vehicles 402a, 402b, 402c that connect with each other via a network 404. FIG. 4 depicts different event types that may happen inside or outside the vehicles 402a, 402b, and 402c. The vehicles 402a, 402b, and 402c may connect with each other to celebrate the event together by activating their respective event modes.

In some aspects, the vehicles 402a, 402b, and 402c may share images or videos (or any other file) with each other, when the vehicles connect. In one aspect, the vehicles 402a, 402b, and 402c may share the images or videos that may be captured by the respective vehicle cameras. Additionally, different vehicles may select and activate different vehicle units (such as different respective vehicle unit configurations) based on user preferences (and other parameters discussed in conjunction with FIG. 2).

In some aspects, the processors (e.g., the processor 242) of the vehicles 402a, 402b, and 402c may transmit, via respective transceivers (e.g., the transceiver 240), the respective vehicle unit configuration to a server (not shown in FIG. 4) via the network 404. In addition, the processors may capture respective event (e.g., images/videos) by activating the interior or exterior cameras based on user preferences. In some aspects, the processors may transmit the captured images/videos (via respective transceivers 240) to the server for storage, when the processors capture the images/videos.

In one or more aspects, the server may aggregate the images/videos from different vehicles 402a, 402b, and 402c, and transmit the aggregated videos to family/friends 406 or to individuals 408. In some aspects, the server may transmit a subset of the images/videos to the family/friends 406 or the individuals 408 based on respective user preferences.

In accordance with further aspects of the present disclosure, the processors may transmit the captured videos or images directly on a social media platform (not shown in FIG. 4) based on user preferences (including event live streaming). In such scenarios, the vehicle users may take attendees consent to upload the captured videos or images on the social media platform. In some aspects, the platform/server may retain the uploaded videos or images for a predetermined duration of time (such as, for example, 2 days), based on user preferences and/or the event time, date, location, or other characteristics.

Figure 5:
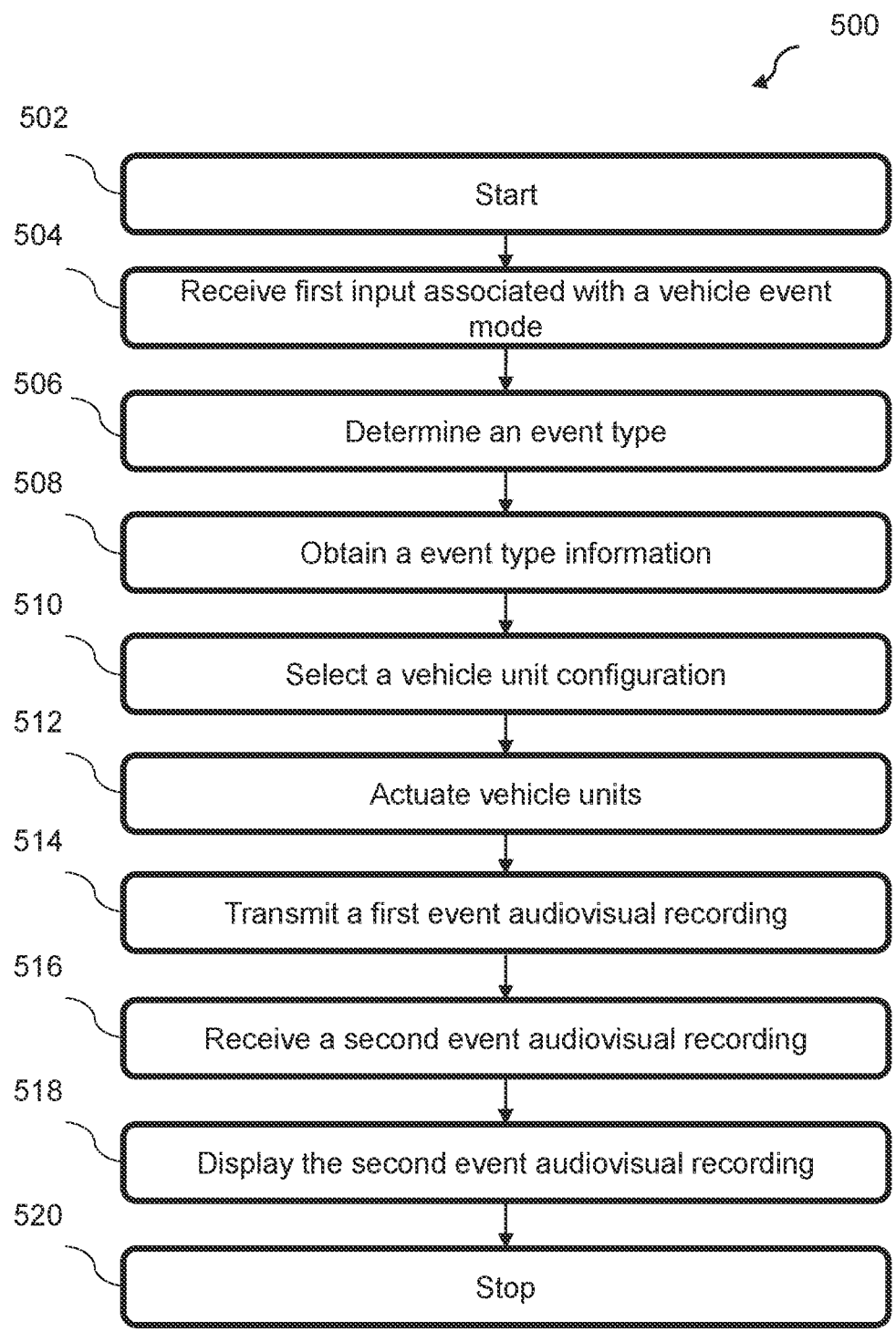
FIG. 5 depicts a flow diagram of an example method for managing a vehicle event mode, in accordance with the present disclosure.

FIG. 5 depicts a flow diagram of an example method 500 for managing a vehicle event mode by the processor 242, in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include receiving a first input associated with a vehicle event mode. As discussed above, the processor 242 may receive the first input from the mobile device 212, the infotainment system 252, or the server 220. The first input may include a request for vehicle event mode activation and details associated with an event type.

At step 506, the method 500 may include determining an event type. In some aspects, the processor 242 may determine the event type based on the first input, as described above in conjunction with FIGS. 1-4.

Responsive to determining the event type, the method 500 may include obtaining an event type information at step 508. In some aspects, the event type information may include user preferences associated with the determined event type. In one or more aspects, the processor 242 may obtain the user preferences (for example, a second input) from the mobile device 212, the infotainment system 252, or the server 220. The user preference details may be understood in conjunction with FIGS. 1-4.

At step 510, the method 500 may include selecting a vehicle unit configuration based on the event type and the user preferences associated with the event type. In some aspects, the vehicle unit configuration may be associated with vehicle units, as described above. The vehicle units may include, for example, exterior/interior camera(s), exterior/interior audio speakers, exterior/interior lights, exterior/interior microphones, a vehicle fragrance system, one or more transceivers (e.g., a vehicle-to-vehicle (V2V) transceiver, a Bluetooth™ transceiver, a ultra-wideband (UWB) transceiver, a fifth-generation (5G) transceiver, a Long-Term Evolution (LTE) transceiver), and the like.

At step 512, the method 500 may include activating/actuating the vehicle units, based on the vehicle unit configuration. For instance, the processor 242 may select and activate an interior vehicle camera (to capture the event experience), a microphone, a vehicle infotainment system, and a vehicle audio system based on the user preferences, if the event/celebration is inside the vehicle.

At step 514, the method 500 may include transmitting a first audiovisual recording (for example, the captured event experience) to the server 220 and/or another vehicle. At step 516, the method 500 may include receiving a second audiovisual recording from the server 220 or the other vehicle.

The details of transmitting and/or receiving the audiovisual recordings are described above in conjunction with previous figures.

In some aspects, the method 500 may include additional steps (not shown in FIG. 5) that may be performed by the processor 242. For instance, the method 500 may include determining whether the event is inside or outside the vehicle. In one or more aspects, the processor 242 may activate the vehicle units based on the determination whether the event is inside or outside the vehicle. The determination of whether the event is inside or outside the vehicle may include determining a vehicle occupation mode (e.g., via vehicle seat sensors). For instance, the processor 242 may determine that the event is inside the vehicle when the processor 242 receives a signal from the vehicle seat sensors that vehicle seats is occupied.

In further aspects, the method 500 may include determining event position or location, when the event is outside the vehicle. In some aspects, the processor 242 may select corresponding vehicle unit configuration, based on the determined event position/location.

At step 518, the method 500 may include displaying the received second audiovisual recording on the vehicle infotainment system. In some aspects, the second audiovisual recording may be displayed based on the vehicle occupation mode and the user preferences.

The method 500 stops at step 520.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to control a vehicle, comprising:
    receiving, via a transceiver, a first input comprising a request to activate a vehicle event mode;
    determining, via a processor, an event type based on the first input;
    obtaining, via the processor, an event type information associated with the event type, wherein the event type information comprises user preferences associated with the event type;
    determining, via the processor and based at least in part on vehicle occupation information collected by a sensor system of the vehicle, a vehicle occupation mode;
    determining, via the processor and based at least in part on the vehicle occupation mode, an event position relative to the vehicle;
    selecting, via the processor, a vehicle unit configuration based on the event type information, the event type, and the event location;
    actuating, via the processor, a vehicle camera and a vehicle microphone to capture a first event audiovisual recording, based on the vehicle unit configuration and the event location; and
    transmitting, via the transceiver, the first event audiovisual recording to a server or a second vehicle.

2. The method of claim 1, the first input is received from a user or the server that stores a calendar of events associated with the user, and wherein the method further comprises storing the first input in a vehicle memory.

3. The method of claim 2, wherein the first input is received from the user via a vehicle Human-Machine Interface (HMI), or a user device.

4. The method of claim 1, wherein the first input further comprises the event type.

5. The method of claim 1 further comprising:
    receiving the user preferences from a user or the server; and
    storing the user preferences in a vehicle memory.

6. The method of claim 1 further comprising:
    determining, via the processor, whether a user is inside or outside of the vehicle, wherein determining whether the user is inside or outside of the vehicle comprises:
        determining the vehicle occupation mode based at least in part on one or more vehicle seat sensors; and
        selecting, via the processor, the vehicle unit configuration based on the vehicle occupation mode.

7. The method of claim 1 further comprises actuating a vehicle audio system, a music system, vehicle lights, an HMI display, and a vehicle fragrance system based on the vehicle unit configuration.

8. The method of claim 1, wherein the transceiver comprises at least one of: a vehicle-to-vehicle (V2V) transceiver, a Bluetooth™ transceiver, a ultra-wideband (UWB) transceiver, a fifth-generation (5G) transceiver, and a Long-Term Evolution (LTE) transceiver.

9. The method of claim 1 further comprising:
    receiving, via the transceiver, a second event audiovisual recording from the server or the second vehicle; and
    displaying the second event audiovisual recording on a vehicle infotainment system, wherein the second event audiovisual recording is displayed based on the vehicle occupation mode and the event type information.

10. A vehicle comprising:
    a transceiver configured to:
    receive a first input comprising a request to activate a vehicle event mode;
    a processor communicatively coupled to the transceiver, wherein the processor is configured to:
    determine an event type based on the first input;
    obtain an event type information associated with the event type, wherein the event type information comprises user preferences associated with the event type;
    determine, based at least in part on vehicle occupation information collected by a sensor system of the vehicle, a vehicle occupation mode;
    determine, based at least in part on the vehicle occupation mode, an event position relative to the vehicle;
    select a vehicle unit configuration based on the event type information, the event type, and the event location; and
    actuate a vehicle camera and a vehicle microphone to capture a first event audiovisual recording, based on the vehicle unit configuration and the event location; and
    wherein the transceiver is further configured to transmit the first event audiovisual recording to a server or a second vehicle.

11. The vehicle of claim 10, wherein the first input is received from a user or the server that stores a calendar of events associated with the user.

12. The vehicle of claim 11, wherein the first input is received from the user via a vehicle Human-Machine Interface (HMI), or a user device.

13. The vehicle of claim 10 further comprising a vehicle memory configured to store the first input.

14. The vehicle of claim 10, wherein the first input further comprises the event type.

15. The vehicle of claim 10, wherein the transceiver is further configured to receive the user preferences from a user or the server, and wherein the vehicle further comprises a vehicle memory configured to store the user preferences.

16. The vehicle of claim 10, wherein the processor is configured to:
   determine whether a user is inside or outside of the vehicle, wherein determining whether the user is inside or outside of the vehicle comprises determining the vehicle occupation mode based at least in part on one or more vehicle seat sensors; and
   select the vehicle unit configuration based on the vehicle occupation mode.

17. The vehicle of claim 10, wherein the processor is further configured to actuate a vehicle audio system, a music system, vehicle lights, an HMI display, and a vehicle fragrance system based on the vehicle unit configuration.

18. The vehicle of claim 10, wherein the transceiver comprises at least one of: a vehicle-to-vehicle (V2V) transceiver, a Bluetooth™ transceiver, a ultra-wideband (UWB) transceiver, a fifth-generation (5G) transceiver, and a Long-Term Evolution (LTE) transceiver.

19. The vehicle of claim 10, wherein the transceiver is configured to receive a second event audiovisual recording from the server or the second vehicle, and wherein the vehicle further comprises a vehicle infotainment system that is configured to display the second event audiovisual recording, based on the vehicle occupation mode and the event type information.

20. A non-transitory computer-readable storage medium in a distributed computing system, the non-transitory computer-readable storage medium having instructions stored thereupon which, when executed by a processor, cause the processor to:
   receive a first input comprising a request to activate a vehicle event mode;
   determine an event type based on the first input;
   obtain an event type information associated with the event type, wherein the event type information comprises user preferences associated with the event type;
   determine, based at least in part on vehicle occupation information collected by a sensor system of the vehicle, a vehicle occupation mode;
   determine, based at least in part on the vehicle occupation mode, an event position relative to the vehicle;
   select a vehicle unit configuration based on the event type information, the event type, and event location;
   actuate a vehicle camera and a vehicle microphone to capture a first event audiovisual recording, based on the vehicle unit configuration and the event location; and
   transmit the first event audiovisual recording to a server or another vehicle.

* * * * *